US009910625B2

(12) United States Patent
Kessels

(10) Patent No.: US 9,910,625 B2
(45) Date of Patent: Mar. 6, 2018

(54) METHOD FOR CREATING SPECIFICATIONS FOR A COMBINED PRINT PRODUCT PROCESSING SYSTEM

(71) Applicant: OCE-TECHNOLOGIES B.V., Venlo (NL)

(72) Inventor: Gerardus G. J. C. Kessels, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/374,639

(22) Filed: Dec. 9, 2016

(65) Prior Publication Data

US 2017/0090828 A1 Mar. 30, 2017

Related U.S. Application Data

(63) Continuation of application No. PCT/EP2015/063103, filed on Jun. 11, 2015.

(30) Foreign Application Priority Data

Jun. 12, 2014 (EP) .................................... 14172128

(51) Int. Cl.
*G06F 3/12* (2006.01)
*G06K 15/02* (2006.01)
*G06K 15/00* (2006.01)

(52) U.S. Cl.
CPC .......... *G06F 3/1208* (2013.01); *G06F 3/1256* (2013.01); *G06F 3/1275* (2013.01); *G06K 15/1856* (2013.01); *G06K 15/404* (2013.01)

(58) Field of Classification Search
None
See application file for complete search history.

(56) References Cited

U.S. PATENT DOCUMENTS

2001/0043346 A1* 11/2001 Roztocil ............... G06F 17/212 358/1.9
2003/0234967 A1* 12/2003 Rodriguez ........ G06F 17/30011 358/518
2005/0060650 A1* 3/2005 Ryan ...................... G06Q 10/06 715/273

* cited by examiner

*Primary Examiner* — Mohammad Ghayour
*Assistant Examiner* — Pawandeep Dhingra
(74) *Attorney, Agent, or Firm* — Birch, Stewart, Kolasch & Birch, LLP

(57) ABSTRACT

A method for creating and processing specifications for a combined print product includes determining a plurality of parts needed to produce the combined print product, selecting a corresponding digital representation of the determined part from a digital representation collection, displaying the digital representations, and creating a digital hierarchical structure of the digital representations. An order in the digital hierarchical structure defines usage of the parts, appliance of the parts and a combination of the parts in a production process of the combined print product. Each part of the plurality of parts belongs to a part category out of a set of part categories, and the plurality of parts includes at least two resources, at least one device action, at least one finishing action, at least one combination action, at least one device and at least two logical concepts. A combined print product processing system is configured to apply the method.

9 Claims, 9 Drawing Sheets

25

1 – A4 – Same-up flipped
1 – Generic Driver
1.1 Print application
1.2.1 JSIT – Same Up Flipped
1.2.2 JSIT – Cover – 2 Staples
1.3 Stapled Document
2 – Bolke/
2 – Bolke 2
2 boekjes + 2 printer
2 boekjes + printer
2 boekjes
2.1 Belke
3.1 Sealed Package 1
4.1 traetman
autohot
Belke
hottest
hottest2

METHOD FOR CREATING SPECIFICATIONS FOR A COMBINED PRINT PRODUCT PROCESSING SYSTEM

CROSS-REFERENCE TO RELATED APPLICATIONS

This application is a Continuation of International Application No. PCT/EP2015/063103, filed on Jun. 11, 2015, and for which priority is claimed under 35 U.S.C. § 120. PCT/EP2015/063103 claims priority under 35 U.S.C. § 119 to Application No. 14172128.2, filed in Europe on Jun. 12, 2014. The entirety of each of the above-identified applications is expressly incorporated herein by reference.

BACKGROUND OF THE INVENTION

1. Field of the Invention

The invention relates to a method for creating and processing specifications for a combined print product, the combined print product being a combination of at least two sub-products, where at least one sub-product is a print product, the method comprising the steps of: determining, based on an output specification of the combined print product, a plurality of parts needed to produce the combined print product; for each determined part, selecting a corresponding digital representation of the determined part from a digital representation collection; and displaying the digital representations of the determined parts on a user interface screen.

The invention also relates to a combined print product processing system configured to apply the method according to the invention.

2. Background of the Invention

Methods for creating and displaying workflows are known, but are incomplete. A workflow system may comprise printing and finishing actions, but the printing device and/or the finishing device is not determined. A workflow system may comprise printing and finishing actions, but the digital resources, like digital documents, and/or the physical resources are omitted from the workflow system. Especially in a combined print product of two sub-products, like two digital documents, or a digital document and a physical appendix, this is cumbersome for giving an overview to the operator. An operator is mentioned, but in general each kind of user may have the same problem when designing or applying a workflow for a combined print product. The combined print product comprises at least two sub-products. Each of the sub-products may be printed and finished as such. Each sub-product apart may be a complete product.

SUMMARY OF THE INVENTION

It is an objective of the invention to provide a method that helps an operator or user to create a structured overview of a combined print product in a user friendly way on a user interface screen.

For this purpose, according to an embodiment of the invention, the method described here-above comprises the steps of: creating a digital hierarchical structure of the digital representations, where an order in the hierarchical structure defines usage of the parts, appliance of the parts and a combination of the parts in a production process of the combined print product; and displaying the digital hierarchical structure on the user interface screen, wherein each part of the plurality of parts belongs to a part category out of a set of part categories, the set of part categories comprising a device, a device action, a finishing action, a media assignment action, a human action, a digital or physical resource, a logical concept, an export action, a content manipulation, a sorting action, a check action, a combination action and a selection action, and wherein the plurality of parts comprises at least two resources, at least one device action, at least one finishing action, at least one combination action, at least one device and at least two logical concepts.

According to an embodiment of the invention, at least two parts of the plurality are resources for the at least two sub-products being planned to be printed on media and/or being planned to be finished. At least one part of the plurality is a printing action to at least partially print at least one sub-product. At least one part of the plurality is a finishing action to at least partially finish at least one sub-product. A finishing action may be a stapling action, a drilling action, a binding action, a perforating action, a stacking action, a folding action, a gluing action, an inserting action, a trimming action, a cutting action or any other kind of finishing action. At least one part of the plurality is a combination action to create a combination of the at least two sub-products. At least one part of the plurality is a printing device configured to at least partially print at least one sub-product according to the at least one printing action. A part of the plurality may be a finishing device configured to at least partially finish at least one sub-product according to the at least one finishing action. At least two parts of the plurality are logical concepts for giving a general name to each of the sub-products of the combined print product. A part may be an export action for exporting a partially processed or unprocessed digital resource to a dedicated storage, like an external storage, for example in a cloud, or to a hot folder triggered external computer program. A part may be a content manipulation for manipulating the content of a resource. A part may be a selection action for selecting and filtering a portion of the digital resource. A part may be a sorting action to rearrange the order of multiple digital resources, with a customizable sorting algorithm. A part may be a check action to perform an automatic or interactive verification of digital resources, with an automatic or interactive continuation of an execution, e.g. a preflight or a visual preview. The check action may have a run-once option, meaning that an action is only performed once on the same document, even if there are multiple executions or the exact same digital resource exists multiple times in the hierarchical structure. A part may be a combination action to merge multiple digital resources into 1 digital resource. A part may be human action, where a human performs a specified action on at least one of the sub-products. This specified action may be specified by any combination of text, audio or video.

By doing so, a parts-based specification method is defined based on the created hierarchical structure that combines production equipment needed for the end product, production steps of the end product, a document structure and PDF content manipulations in a single model. Once the specification is done, only the essential resources, e.g. documents and number of copies, need to be specified, for example manually by the user, or automatically via a print job ticket generated by a management information system. By making the scope of the parts small enough, flexibility is achieved in order to arrange the parts, re-arrange the parts and create different combined print products and different production orders. The parts are equivalent but not similar.

A part is a part having a part category. A part category may be a device, a device action, a finishing action, a media assignment action, a human action, a digital resource, a physical resource, a logical concept, an export action, a content manipulation, a sorting action, a check action, a combination action or a selection action. By using so many different part categories, a hierarchical structure can be created which comprises at least the major facets of a workflow, which leads to the combined print product. Since each sub-product apart may be a complete product, a combination action or human action to combine the two sub-products is also part of the hierarchical structure. From the hierarchical structure, views may be extracted based on the category of the part, for example a view showing only devices, a view showing only the required documents, etc. A part may also be used to specify non-print related device actions or human actions, for example for fulfillment purposes like gluing a CD to an inside of a cover of a book. The CD is an example of a physical resource. Other examples of a physical resource in a combined print product according to the invention is a pencil, a pen, a plastic card, a ticket, a business card, a gadget, a 3D-printed object, a pre-printed tear out, a non-printed object, etc.

According to an embodiment, each of the at least two sub-products is a complete product produced according to the hierarchical structure and is designed for a separate use by the end user of the combined print product. The combined print product comprises at least two sub-products. The at least two complete sub-products have to be combined by means of a combination action into the combined print product.

According to a further embodiment, each of the sub-products is printed and finished as such and each sub-product apart is a complete product and is designed for a separate use by an end user of the combined print product. The combination action for these at least two sub-products is represented in the hierarchical structure and may be a stapling action or any other finishing action for combining the at least two complete sub-products.

According to an alternative embodiment, at least one of the two complete sub-products is printed and finished as such and at least one of the two complete sub-products is a finished pre-fabricated product, like a CD, pen, pencil, gadget or 3D-printed object or a non-printed object. Each sub-product of this embodiment is a complete product and is designed to be separately used by an end user of the combined print product. The combination action for these at least two kinds of complete sub-products is represented in the hierarchical structure and may be a stapling action, a sealing action, a gluing action, an inserting action, a binding action or any other fixing action for combining the at least two complete sub-products.

According to an embodiment of the method, the method comprises the steps of: deriving a workflow of steps from the created hierarchical structure of the digital representations; and executing the steps of the workflow on the at least one device in the hierarchical structure in order to deliver the combined print product.

According to an embodiment, the method comprises the step of automatically receiving a specification of the combined print product.

According to an embodiment, at least two resources are digital resources to be printed on a recording medium.

According to an embodiment, at least one resource is a digital resource to be printed on a recording medium and at least one resource is a physical resource at least to be finished according to a device action of the plurality of parts. For example, at least one resource is a digital resource to be printed on a recording medium for producing a first sub-product and at least one resource is a physical resource to be combined with the first sub-product.

According to an embodiment, the method comprises the step of predicting a production time of the combined print product derived from the digital hierarchical structure.

According to an embodiment, the method comprises the step of predicting a cost of each of the at least two sub-products.

The invention also relates to a combined print product processing system comprising: at least one device for execution of device actions; a memory storage configured to store digital resources; a receiving mechanism configured to receive an output specification of a combined print product, the combined print product being a combination of at least two-sub-products; a determining mechanism configured to determine a plurality of parts needed to produce the combined print product based on an output specification of the combined print product; a collection storage configured to store a digital representation collection; a selector configured to select, for each determined part, a corresponding digital representation of the determined part from the collection storage; a user interface comprising a screen for displaying the digital representations of the determined parts and for displaying a digital hierarchical structure; and a controller for creating the digital hierarchical structure of the digital representations where an order in the hierarchical structure defines usage of the parts, appliance of the parts and a combination of the parts in a production process of the combined print product, wherein each part of the plurality of parts belongs to a part category out of a set of part categories, the set of part categories comprising a device, a device action, a finishing action, a media assignment action, a human action, a digital or physical resource, a logical concept, an export action, a content manipulation, a sorting action, a check action, a combination action and a selection action, and wherein the plurality of parts comprises at least two resources, at least one device action, at least one finishing action, at least one combination action, at least one device and at least two logical concepts.

The invention also relates to a non-transitory computer readable medium comprising computer executable program code configured to instruct a computer to perform the method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMEMTS

Figure 1:
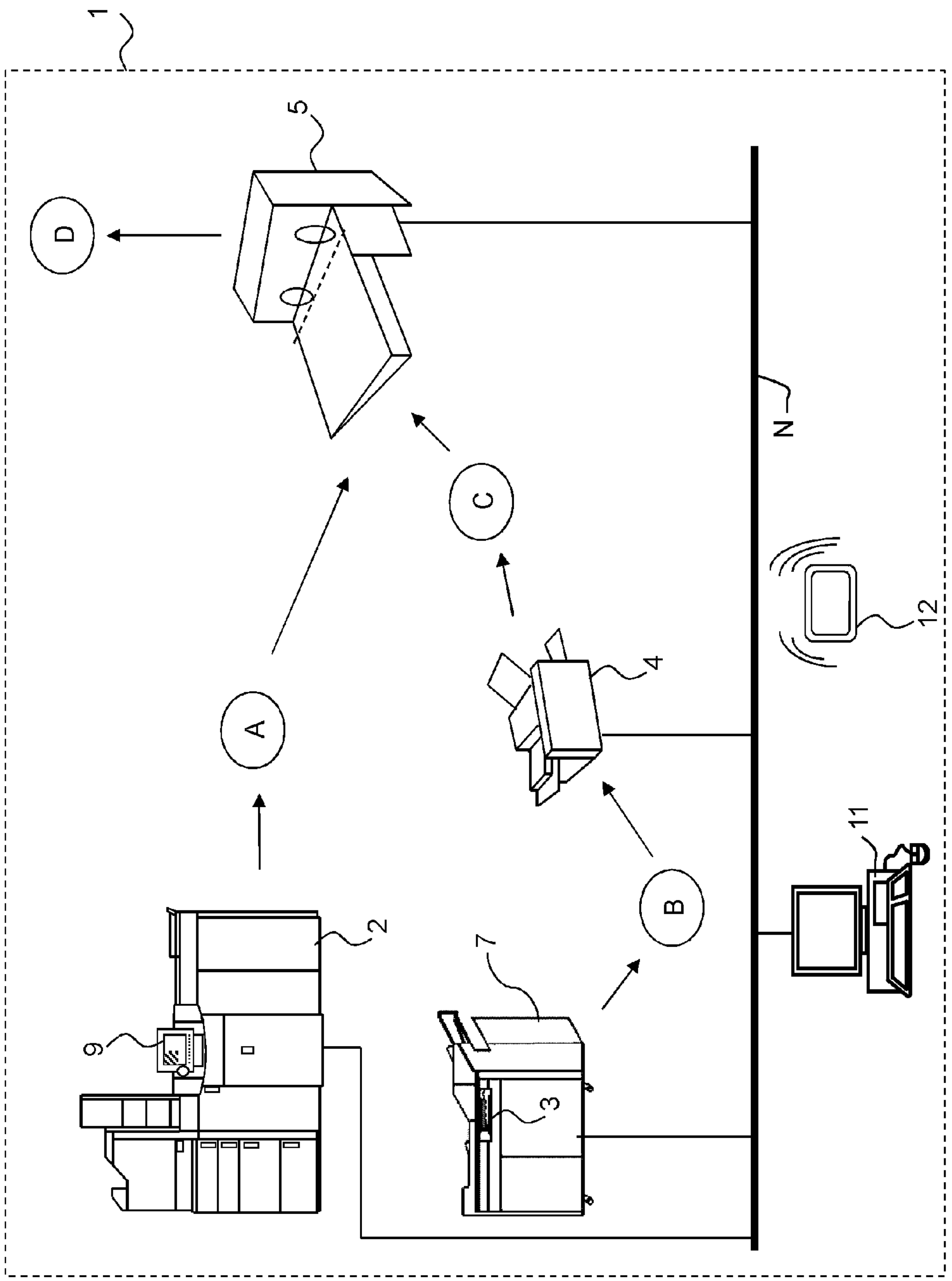
FIG. 1 shows a schematic general arrangement of the combined print product processing system comprising a plurality of devices according to the invention.

The present invention will now be described with reference to the accompanying drawings, wherein the same or similar elements are identified with the same reference numeral.

FIG. 1 shows a schematic general arrangement of a combined print product processing system 1 according to the invention. This combined print product processing system 1 comprises two printers 2, 7 connected to a network N. Each of the printers 2, 7 comprises a control unit (not shown) for controlling of a printing process by the printers 2, 7 and a user interface screen 3, 9. A work station 11 is connected to the network N. The work station 11 may act as a control unit or controller for any of the printers 2, 7 of the combined print product processing system 1. The screen of the workstation 11 may act as a user interface screen of the combined print product processing system 1 in order to create and display the hierarchical structure of parts according to the invention. A mobile device 12 may be wirelessly connected to the network N. The screen of the mobile device 12 may act as a user interface screen of the combined print product processing system 1 in order to create and display the hierarchical structure of parts according to the invention. A control unit of one of the printers 2, 7 may act as a central and data gathering control unit for performing the steps of the method according to the invention. However, a control unit for controlling the method according to the invention separate from the printers 2, 7, but connected to the network N, like the work station 11, may be envisioned. Print jobs submitted to any one of the printers 2, 7 arrive in a corresponding print job queue or in a receiving mechanism in the gathering control unit. A print job may comprise at least one digital document to be printed and finished as specified in the print job specifications.

The gathering control unit has memory storage for storing digital resources, a receiving mechanism configured to receive output specifications of the combined print product, a determining mechanism configured to determine parts to be used for producing the combined print product, a collection storage for storing a collection of digital representations of determined parts according the method of the invention and a selector configured to select digital representations for the determined parts.

In FIG. 1, a combined print product D has to be produced as a sealed product. The combined print product D is sealed by a sealing device 5. The sealing device 5 receives two physical - printed and finished - documents A and C, that are gathered together by a human operator. The physical documents A and C have been combined to the combined print product D by a seal around the physical documents A and C.

Document A is produced by printer 2. The printer 2 has received a first digital document (not shown) submitted by a user.

A first action applied to the first digital document may be an imposition action. An imposition scheme is derived from the print job specifications and applied to the first digital document. The application of the derived imposition scheme may take place on a workstation comprising the first digital document. The application of the derived imposition scheme may take place on the control unit of the printer 2 after submission of the derived imposition scheme together with the first digital document to the control unit of the printer 2.

A second action applied to the imposed first digital document is printing the first digital document on a receiving medium.

A third action applied to the printed imposed first digital document is a staple action. The printer 2 is provided with a built-in staple device for stapling the printed imposed first digital document.

A fourth action applied to the stapled printed imposed first digital document is a multi-half-fold action. The printer 2 is provided with a built-in multi-half-fold device for multi half-folding the stapled printed imposed first digital document.

By applying the first, second, third and fourth actions to the first digital document, a logical concept of an installation manual representing document A is conceived.

Document C is produced by a folding device 4. The folding device 4 has received a document B from the printer 7 through a transportation action of a human operator. The folding device 4 folds the document B and delivers document C. By applying this folding action to the printed document B a logical concept of a user manual representing document C is conceived.

Document B is produced by printer 7. The printer 7 has received a second digital document (not shown) submitted by a user.

A first action applied to the second digital document is an imposition action. An imposition scheme is derived from the print job specifications.

The application of the derived imposition scheme may take place on the workstation 11 comprising the second digital document. The application of the derived imposition scheme may take place on the control unit of the printer 7 after submission of the derived imposition scheme together with the second digital document to the control unit of the printer 7.

A second action applied to the imposed second digital document is printing the second digital document on a receiving medium.

According to the method of the invention, the plurality of parts needed to produce the combined print product is determined. The plurality of parts comprise the sealing device 5, the printer 2, the printer 7, the folding device 4, the sealing action by sealing device 5, the print action by the printer 7, the print action by printer 2, the folding action by the folding device 4, the imposing action by printer 2, the imposing action by printer 7, the stapling action by printer 2, the multi-half-folding action by printer 2, the implicit human action to gather documents A and C together to the sealing device 5, the implicit human action to transport document B to the folding device 4, the logical concepts "user manual" and "installation manual," the first digital document, the implicit selection action of all pages of the first digital document, the second digital document and the implicit selection action of all pages of the second digital document. Each of the parts is a building block for creating the hierarchical structure according to the invention. The software application that creates the hierarchical structure comprises a collection of digital representations of the parts. The digital representations of the parts are shown on a user interface screen of the combined print product processing system 1, for example on the screen of workstation 11. The user is able to move the digital representations of the parts in an order of the production of the combined print product D. The order defines the usage of the parts, the appliance of the parts and/or the combination of the parts in the planned production of the combined print product D. Once the user has created the hierarchical structure on the user interface screen, the application translates the hierarchical structure into workflow instructions in a format suitable for the human operator or user, for the printers, for the folding device and for the sealing device.

Figure 2:
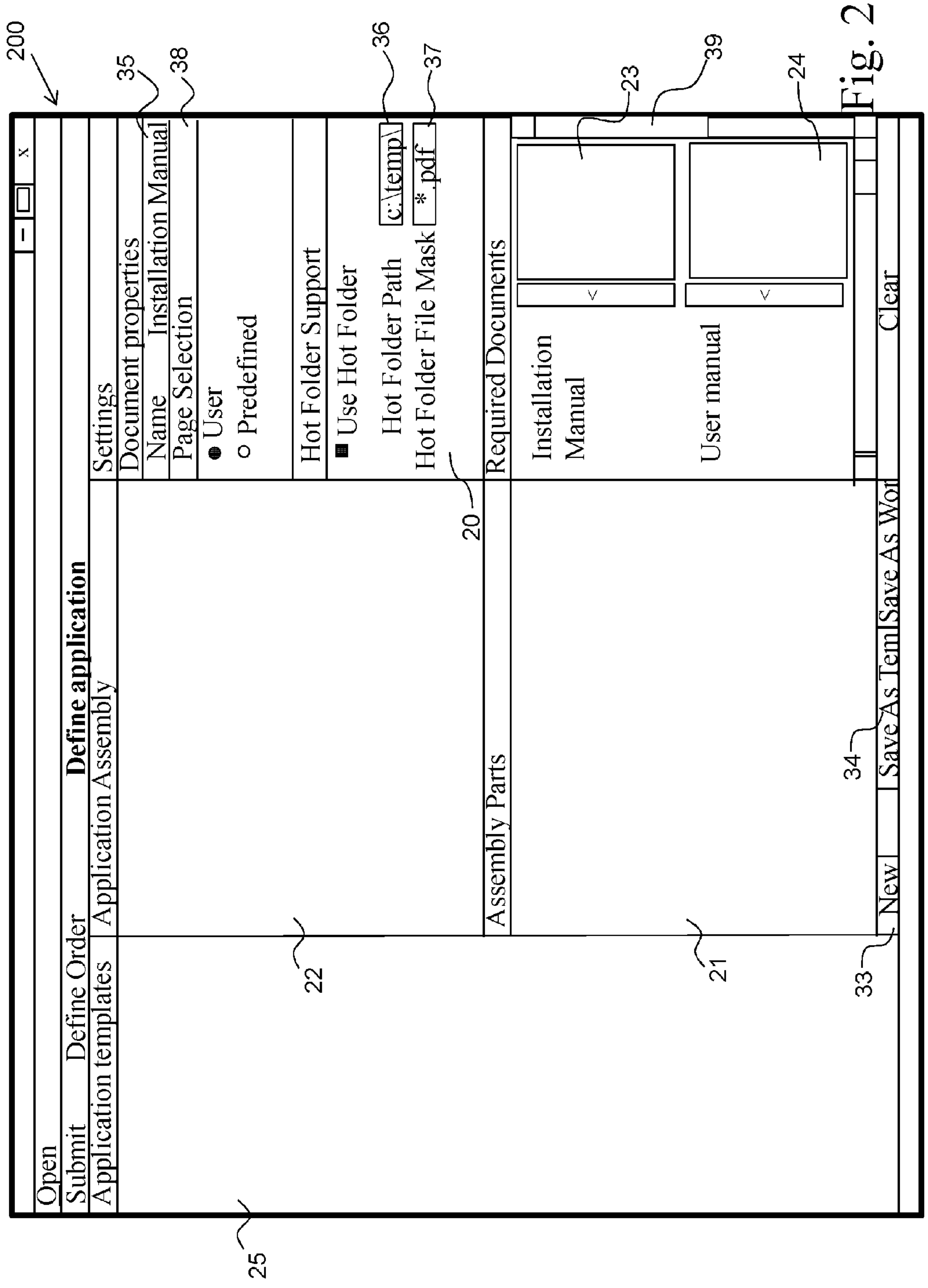
FIGS. 2-3 show windows on a user interface screen according to the method of the invention.
Figure 2A:
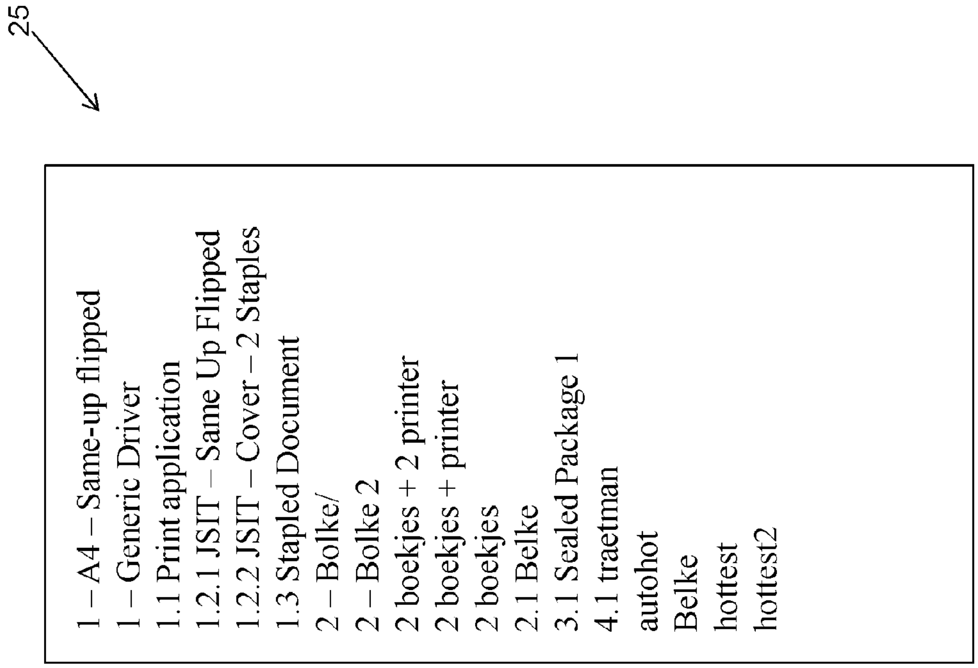
FIGS. 2A, 2B and 2C show detailed parts of FIG. 2.
Figure 2B:
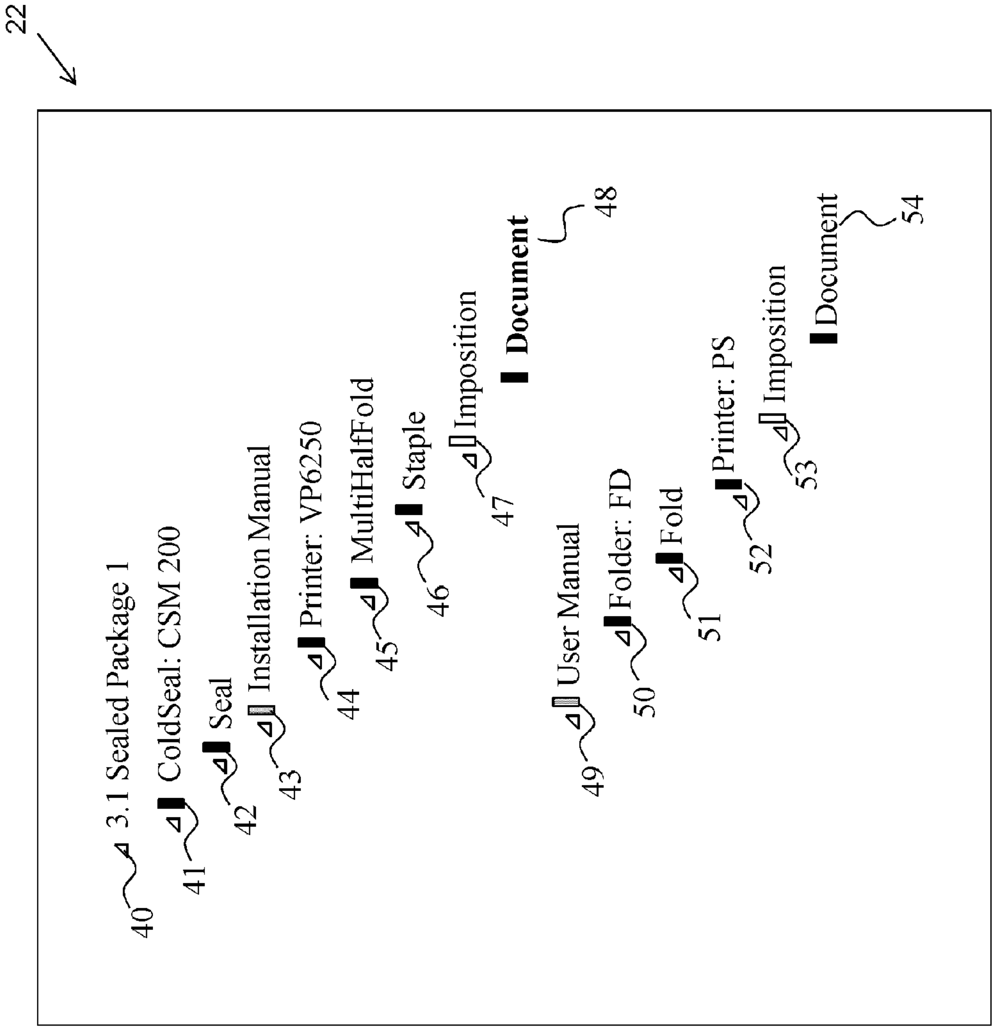

FIG. 2 shows a window 200 on the user interface screen according to the invention. By means of the window 200, the hierarchical structure according to the invention may be created. The window 200 comprises a top center pane 22 (see FIG. 2B) displaying the hierarchical structure of the combined print product down to its composing intermediate or executing parts. A representation of a part in window 200 will hereinafter be referenced to by the part directly. A root element 40 contains a name of the end product "Sealed Package 1," a sealed bag of a black and white installation manual and a folded color poster, which is a user manual. A first child (device part) 41 specifies a device, a cold seal machine 'CSM 200' used for executing the child's action(s). The cold seal machine is an offline device, meaning there is no direct physical connection with the device producing the physical documents 43 and 50. Being an offline device, a human action part is implicitly encapsulated in the device part 41. The action 42 'seal' to be performed on all of its child parts together at the same hierarchy (in this case it means a sealing of "Installation Manual" and "User Manual" together in a bag as both are at the same hierarchy level. A first child 43 of the seal action is the "Installation Manual." The "Installation Manual" is a logical concept, which is a place holder to clarify the structure of the product described by its children. Here it is used to encapsulate the specification of the first printed product, which is a multi-half-folded and stapled black and white booklet. A child of the logical concept 43 is production equipment 44 to be used: a VP6250 printer. The VP6250 printer comprises a controller connected to a printer configuration. The printer configuration comprises a print engine and inline folding and stapling equipment. A last finishing action 45 in creating the "Installation manual" booklet is to perform a multi-half-fold action. In another hierarchical structure, a booklet maker may be incorporated to perform the multi-half-fold action. Before doing the multi-half-fold action 45, a staple operation 46 is performed. An "Imposition" action 47 is performed on a concatenation of all documents specified in its children. The concatenation may be a separate action part, which may include sorting of the children. In this case, there is only one child 48, but a set of children can be envisioned (e.g. when each chapter of a booklet is delivered as a separate document). The "Imposition" action may also define the media to be used, as imposition and media assignment may influence each other. In another embodiment, the media assignment is defined as a new media assignment action part in the hierarchical structure.

A child of the "Imposition" action is an input PDF document 48. This is a named place holder: the actual document is not required for specifying the product. Here a user-defined name of the place holder 48 is "Installation manual," which is specified in a top-right parameter pane 20, and reflected in the bottom-right required document's pane 39 as a scrollable rectangular object 23. Implicitly all pages of the document referenced by the document placeholder 48 are selected for the imposition action 47. In another embodiment, the selection of relevant pages may also be specified via a selection action part (not shown) as a child of the imposition part 47.

In an embodiment, further settings relating to the document part are specified in pane 20. The path to a hot folder 36 to be monitored for incoming digital documents may be specified. A file mask 37, e.g. a hot folder file mask as in FIG. 2, specifies a file name pattern match expression, to automatically match a digital document to a document part based on the file name. In another embodiment, another digital document to document part matching algorithm can be used.

The bottom right required document's pane 39 also comprises a second page-scrollable rectangular object 24 representing pages of a second digital document: a large folded color poster. To encapsulate the second printed product in the hierarchical structure in pane 22, a second logical concept 49 named 'User Manual' is introduced. A final step in the chain of the "User Manual" is executed on a FD folder device 50. The action 51 to be performed is a fold. The fold 51 is executed on the output from the next child 52, which is a printer system PS comprising a digital front end and a print engine. The printer system PS may comprise inline finishing devices. The printer system PS is the printer 52 used for printing the document. Folder device 50 is an offline device that implicitly encapsulates a human action part that defines to collect the output of the printing device 52 and to setup the folder device 50 according the specifications in the fold action 51. The imposition 53 and media are selected for the document defined in a child 54 of the imposition 53.

According to another embodiment, the media assignment is defined as a new media assignment action part in the hierarchical structure. A child of the "Imposition" action is an input PDF document 54. This is a named place holder: the actual document is not required for specifying the product. Here a name of the place holder 54 is "User manual," which is reflected in the bottom-right required document's pane 39 as a scrollable rectangular object 24.

Figure 2C:
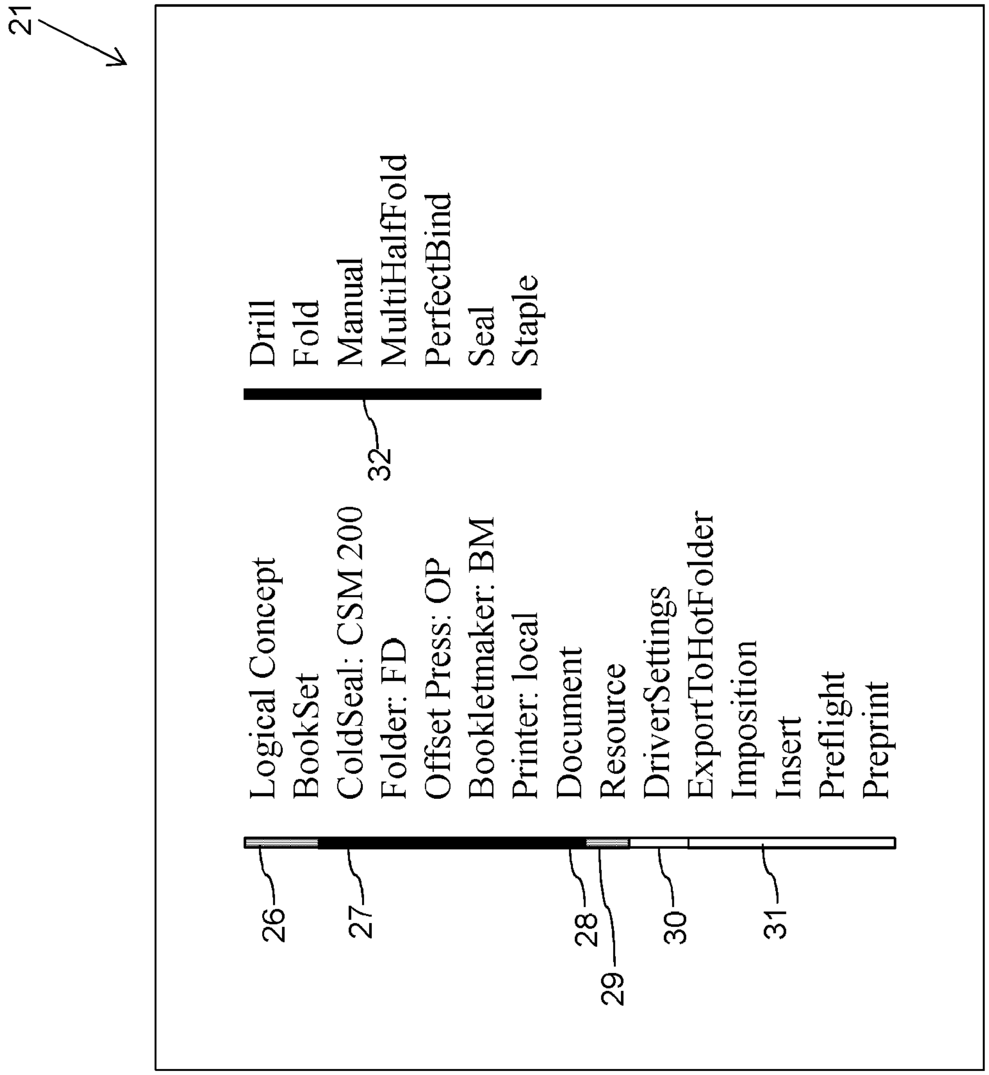

The hierarchical structure displayed in pane 22 may be created via dragging and dropping of parts from an assembly part repository shown in the bottom center pane 21 (See FIG. 2C). The parts in the pane 21 are grouped per part category. A color of a solid bar in front of the parts in pane 21 determines the part category. A first part category 26 is a category of logical concepts. A second part category 27 is a category of devices. A third part category 28 is a category of digital resources. A fourth part category 29 is a category of physical resources. A fifth part category 30 is a category of driver settings. A sixth part category 31 is a category of digital document content manipulation actions. A seventh part category 32 is a category of finishing actions. Other ways of creating the hierarchical structure may be envisioned, for example through context menus in a main tree or via a scriptable interface, which is suitable for integration of the creation of the hierarchical structure in an automated workflow. An actual visualization of the hierarchical structure, the part categories, the part repositories and settings may be optimized in several ways. According to an embodiment, the user knows and decides how a certain end product needs to be produced and the user decides for the equipment to use.

According to a further embodiment, the method according to the invention also comprises the step of automatically finding a production route by automatically finding the equipment steps by a separate algorithm. Relocating actions by the user or automatically, e.g. finishing actions from inline to offline and vice versa, may be envisioned at finding the optimal production route.

When the user selects a part in the hierarchical structure in pane 22, configuration parameters, which are relevant for the selected part, are shown in a top-right settings pane 20. Specific parameters for the end product may be defined in this pane 20. Settings may also be locked in order to make these settings unchangeable during submission of a digital resource.

A new hierarchical structure for a new combined print product may be created and saved as a template by means of a new button 33 and a save button 34 at the bottom of the pane 21. A collection of already made templates are gathered and selectable in the left pane 25 of window 200 (see FIG. 2A). An actual visualization of the template repositories, associated action commands and status feedback may be optimized in several ways.

According to a further embodiment, the method comprises the step of saving at least a part of a branch of the hierarchical structure separately for re-use. This may be achieved, for example by selecting the part of the branch in the hierarchical structure in the pane 22 and selecting a save action command in a context menu. An actual visualization of selecting branch parts, associated action commands and status feedback may be optimized in several ways.

According to an embodiment, the representation of a part is implemented as a dynamically loadable part at start up of the application or via a separate configuration step allowing easily adding of a new part with new functionality, but also enabling storage of such a part as part of the product specification. By doing so, long-term archiving and exact reprint functionality is enabled.

Figure 3:
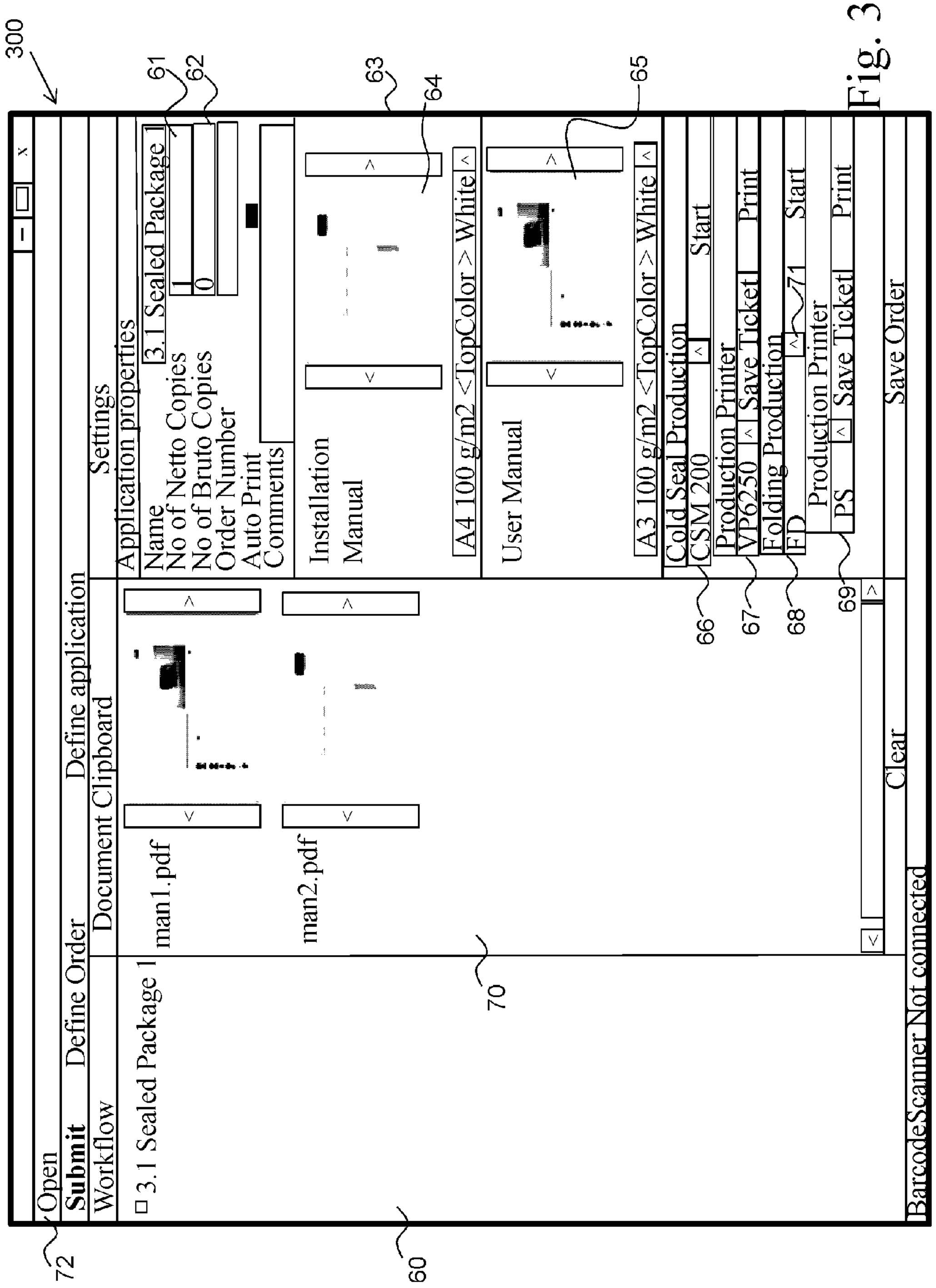

FIG. 3 shows a window 300 of the application on the user interface screen according to the invention. By means of the window 300, the specification of the hierarchical structure template created on window 200 in FIG. 2 may be executed. A left column 60 shows an overview of the combined print products or applications. In this case, there is only the product "Sealed Package," which is selectable in the left column 60. An actual visualization of the combined print products repositories, associated action commands and status feedback may be optimized in several ways. When the combined print product in left column 60 is selected, only relevant or at least all unlocked settings are shown in the right-most column 63. A number of copies 61, 62, required PDF files 64, 65 and production equipment parts 66, 67, 68, 69 are displayed in the right-most column 63. An actual visualization of the settings, required documents placeholders, associated action commands and status feedback may be optimized in several ways.

The order of execution on the production equipment is presented at the right bottom by a hierarchy. A root 66 in the hierarchy may only start when all of its children 67, 68 are ready with their actions. In this particular case, sealing is only possible when the installation manual has been printed on the VP6250 printer 67 and the user manual has been folded on the FD folder device 68. The FD folder device 68 may only start when the PS printer system 69 is ready with printing the print job. Both the VP6250 printer 67 and the PS printer system 69 are greyed out, because in the specification production is only allowed on these printers, e.g. because the selection of these printers is locked in the hierarchical structure specification. The FD folder device 68 is not greyed out and is a free choice and may still be changed. Another folder device may be selected from a dropdown list 71. An actual visualization of the production equipment hierarchy, settings, associated action commands and status feedback may be optimized in several ways.

A middle pane 70 is a document clipboard representing a temporary storage for holding and selecting digital documents. The document clipboard holds digital documents opened via a File-Open menu 72 or via drag-and-drop of files or complete directories comprising files, or received via monitoring a hot folder. From the document clipboard, the user may quickly assign documents through drag-and-drop to the required document place holders as defined in the hierarchical structure for the selected combined print product in pane 60.

Another way of specifying a print job is to drag and drop a file or an entire directory with files on a combined print product specification in the left column 60. In this case, the settings column 63 shows settings belonging to the selected combined print product. All files are loaded into the document clipboard 70 and will automatically populate the requirement document place holders in the settings pane 63. Populating may be achieved by filename pattern matching or by a file identification lookup file as specified for the saved template on window 200 of FIG. 2.

The production equipment parts, i.e. device parts, are collected together in a separate view at the right-bottom corner of window 300. When all prerequisites for the production equipment are fulfilled, the production can start. The start may be a manual action, for example pressing a print button, or can be set as automatic, reducing human interaction. In another case, for example for unconnected equipment, the action may be to print out an instruction message and add the printed instruction message to an order bag.

Figure 4:
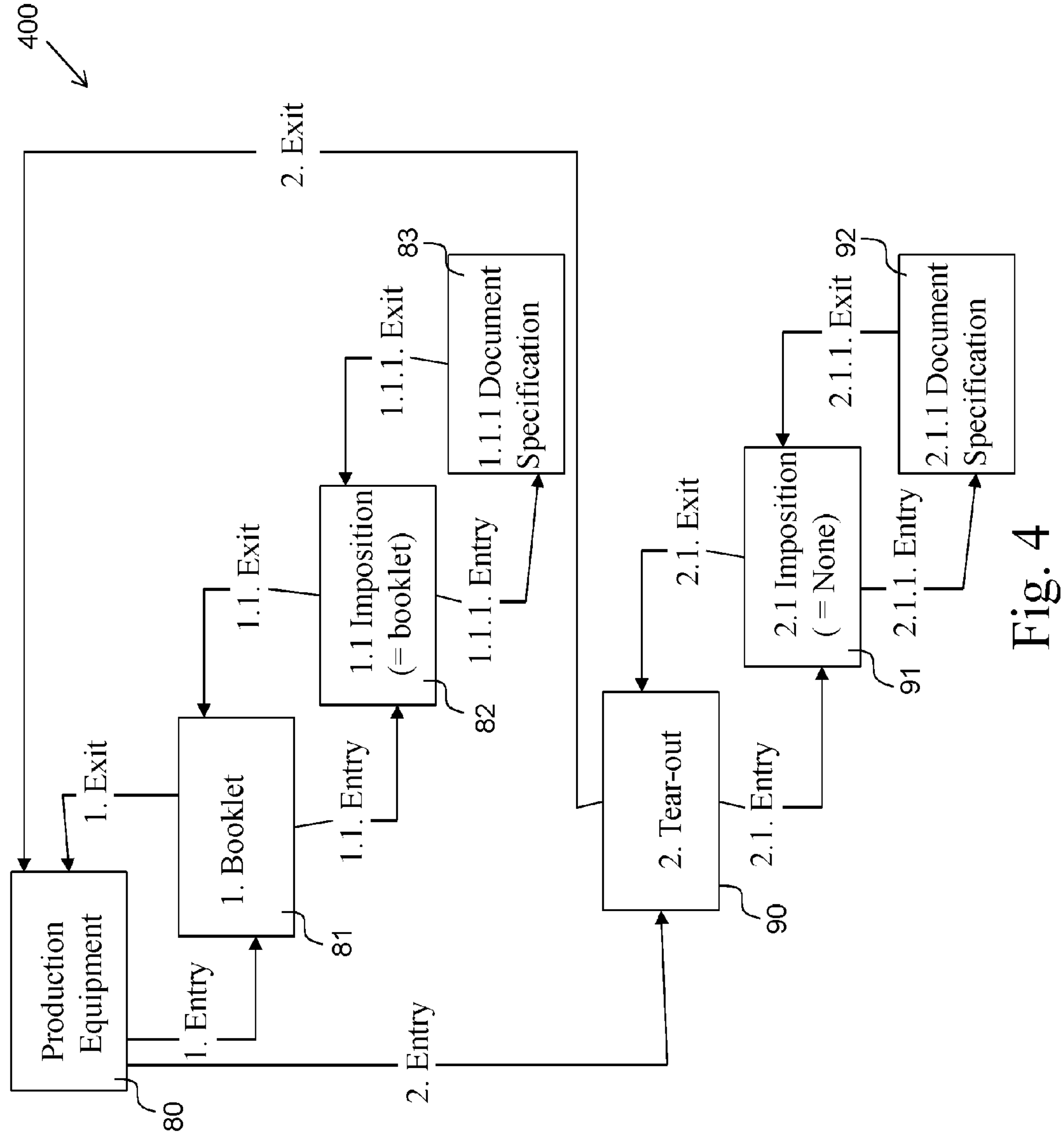
FIGS. 4-6 are flow diagrams of the method according to the invention.

The implementation of the hierarchical structure according to the invention is elucidated by means of FIG. 4. Each part of the hierarchical structure comprises a model and business logic implementation, i.e. a logic part, and a settings graphical user interface implementation, i.e. a UI part. The logic part is referencing which UI part is responsible for displaying options of the logic part. A relation between the logic part and the UI part is performed via binding of user interface control elements to exposed view properties of the model. Each part holds an intermediate resulting digital document, references to a physical document, at least one device job ticket and an instruction message. Depending on the part, one of these elements may be empty. In this example, the intermediate resulting digital document will be a PDF file and the job ticket will be a JDF ticket. The references to a physical document and the instruction message are empty.

To perform an action, a controller component implements a hierarchical visitor pattern, being a well-known software design pattern, and each logic part acts as a visited client. FIG. 4 illustrates a principle of a hierarchical visitor pattern in a diagram 400. For clarity, the multi-half-fold action and the staple action just below the device root in the hierarchical structure in window 200 in FIG. 2 are not included.

Starting from the part representing the production equipment, which may be a human being, and may include human actions, the parts are visited and methods are called upon entry of a part and upon exit of a part, when all the children of the part have been visited. So in the figure below, the call chain is 1.Entry→1.1.Entry→41.1.1.Entry→1.1.1.Exit→1.1.Exit→1.Exit→2.Entry→2.1.Entry→2.1.1.Entry→2.1.1.Exit→2.1.Exit→2.Exit, giving each part two moments in the execution chain to perform an operation.

Currently, the entry methods and exit methods address the creation of the printable PDF file and the creation of a ticket, for example a JDF ticket or an instruction message for not connected off-line finishing equipment.

At start of execution, the top production part 80 (Production Equipment) holds an empty PDF file, and creates a basic job ticket, for example a JDF ticket, containing global and generic information relevant for that production equipment 80, e.g. order information. A JDF ticket template may be a basis for the global and generic information. A job ticket generation may be adapted depending on what kind of production equipment is actually representing the top production part 80. For a specific production device, a device specific ticket format is generated.

When a first child 81 is visited (1.Booklet), a JDF ticket entry method is called (1.Entry).

A parent's JDF ticket (Production Equipment') is copied to a local JDF ticket (in 1.Booklet). Optionally, any part specific ticket adaptations that can already be applied are performed. An empty PDF file is passed on to the first child 81 (1.Booklet).

Next, a first child part 82 (1.1.Imposition) is visited (1.1.Entry). Again, the corresponding parent JDF ticket (which is stored in 1.Booklet) is copied to a local JDF ticket (in 1.1.Imposition), and any part-specific modifications are made. In the same way, a next child part 83 (1.1.1.Document specification) is called (1.1.1.Entry). As the child part 83 is a document specification part, a referenced PDF file will be loaded from storage, and any actions specified in parameters of the document specification part, will be executed, resulting in a new PDF file to be created. For example, a subset of pages from the document may be specified. Only the subset may be extracted. The newly created PDF file is appended to the PDF file in the parent 82 (=1.1.Imposition). As in this case, there is an empty parent PDF file, so the child PDF file will become the parent PDF file.

As there are no more child parts, an exit method of part 83 (1.1.1.Document) is called (1.1.1.Exit) and the sequence continues with the call to an exit method (1.1.Exit) of part 82 (1.1.Imposition).

In the exit method of part 82, the following steps are applied:

- the booklet imposition is applied on the PDF file just stored in the part 82,
- associated media selection(s) are updated in the JDF ticket in the part 82, as now the created PDF sheets are known,
- the PDF file is appended to the empty PDF file in the parent part 81, and
- the JDF ticket in the parent part 81 is replaced with the JDF ticket in the part 82.

Execution continues by calling an exit method (1.Exit) to part 81 (1.Booklet). As this part 81 is a logical concept part, it appends its PDF file to an (empty) PDF file in the parent's part 80 (Production Equipment) and stores the JDF ticket in the parent's part 80.

According to a next step, a child 90 (2. Tear-out) is visited, but this time the root part 80 (Production Equipment) contains a PDF file and JDF ticket. Similar to the sequence of visits to parts 81, 82, 83, all children 90, 91, 92 are visited, passing on the JDF ticket from the parent 80 and an empty PDF via a logical concept part 90, an imposition part 91 down to a document part 92 (2.1.1 Document) where a tear-out PDF is loaded from storage, and passed on to part 91. Part 91 (2.1 Imposition) contains an imposing specification of 'none' on the PDF file and appends this PDF file to the empty PDF of its parent part 90 (2.1 Tear-out). In part 91 (2.1 Imposition), the JDF ticket is extended with the media specifications for the tear-out file, and passed on to the parent element 90 (2. Tear-out). Finally, the updated JDF ticket is transferred to the parent part 80, and the PDF file in part 90 is appended to the PDF file stored in the parent part 80, which contains the booklet imposition created in the booklet hierarchy structure (81, 82, 83).

When this child 90 is completely performed, a clean-up of the resulting JDF ticket is performed by the 'Production Equipment' part 80. The print ready PDF file and the cleaned-up JDF ticket are stored in local files, ready to be sent to the printer.

According to an embodiment of the method, a hierarchical structure is linked to a specific production order. As a template of the end-product is defined without any reference to documents, it is possible to link a created template of the hierarchical structure to a specific production order. PDF files belonging to an order may be stored in an order-specific directory on a central file-server. When the template is stored together with the PDF files in such a directory, a submitter may create a complete product based on the order number. The order number may, for example be scanned with a barcode scanner.

Figure 5:
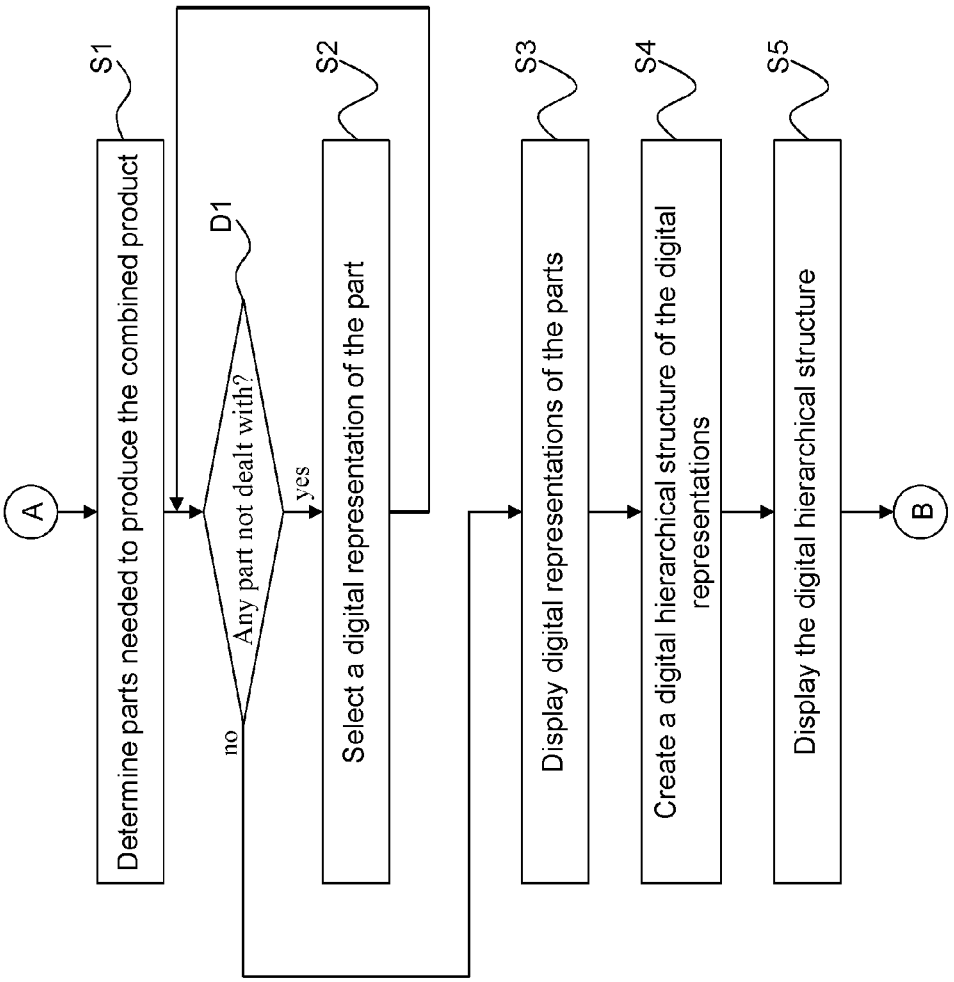

FIG. 5 is a flow diagram of the method according to the invention. The method is used for a combined print product processing system comprising a plurality of devices and a user interface screen. Specifications for a combined print product, being a combination of at least two sub-products, are processed.

A first embodiment of the method is explained in FIG. 5. A starting point A in FIG. 5 leads to a first step S1.

In the first step S1, a plurality of parts needed to produce the combined print product is determined based on an output specification of the combined print product. Each determined part of the plurality of parts belongs to a part category. The part category may be a category out of a device, a device action, a finishing action, a media assignment action, a human action, a digital or physical resource, a logical concept, an export action, a content manipulation, a sorting action, a check action, a combination action and a selection action. Since the product to be produced is a combined print product, the plurality of parts comprises at least two resources, at least one device action, at least one finishing action, at least one combination action, at least one device and at least two logical concepts.

A second step S2 is executed for each determined part in a first loop over the plurality of determined parts. The first loop starts in a first decision step D1, which checks if there is a determined part that has not been dealt with. If there is a determined part not dealt with according to the method, the method proceeds with the second step S2. If all determined parts are dealt with, the method proceeds with a third step S3.

According to the second step S2, a corresponding digital representation of the determined part is selected from a digital representation collection. The digital representation collection may reside in memory in a control unit or workstation of the combined print product processing system.

In a third step S3, the digital representations of the determined parts are displayed on the user interface screen. The digital representations may be displayed in a collection pane of a window displayed on the user interface screen. In an alternative embodiment of the method according to FIG. 5, the third step S3 may be part of the first loop for each part of the hierarchical structure.

In a fourth step S4, a digital hierarchical structure of the digital representations is created in an order of at least one of usage of the parts, appliance of the parts and a combination of the parts in a production process of the combined print product. A user may gather and position on the user interface screen the digital representations of the determined parts in a separate compose pane of a window displayed on the user interface screen. The movements of the digital representations on the user interface screen are captured and transferred to the control unit in order to create the digital hierarchical structure.

In a fifth step S5, the digital hierarchical structure is displayed on the user interface screen.

The first embodiment of the method ends in end point B.

According to a further embodiment of the method according to FIG. 5, the first step S5 is preceded with a step of automatically receiving an output specification of the combined print product. The output specification is a digital representation of the combined print product. In this way, devices, device actions, digital resources like documents and physical resources like physical appendices, needed for the production of the combined print product may be automatically determined.

Figure 6:
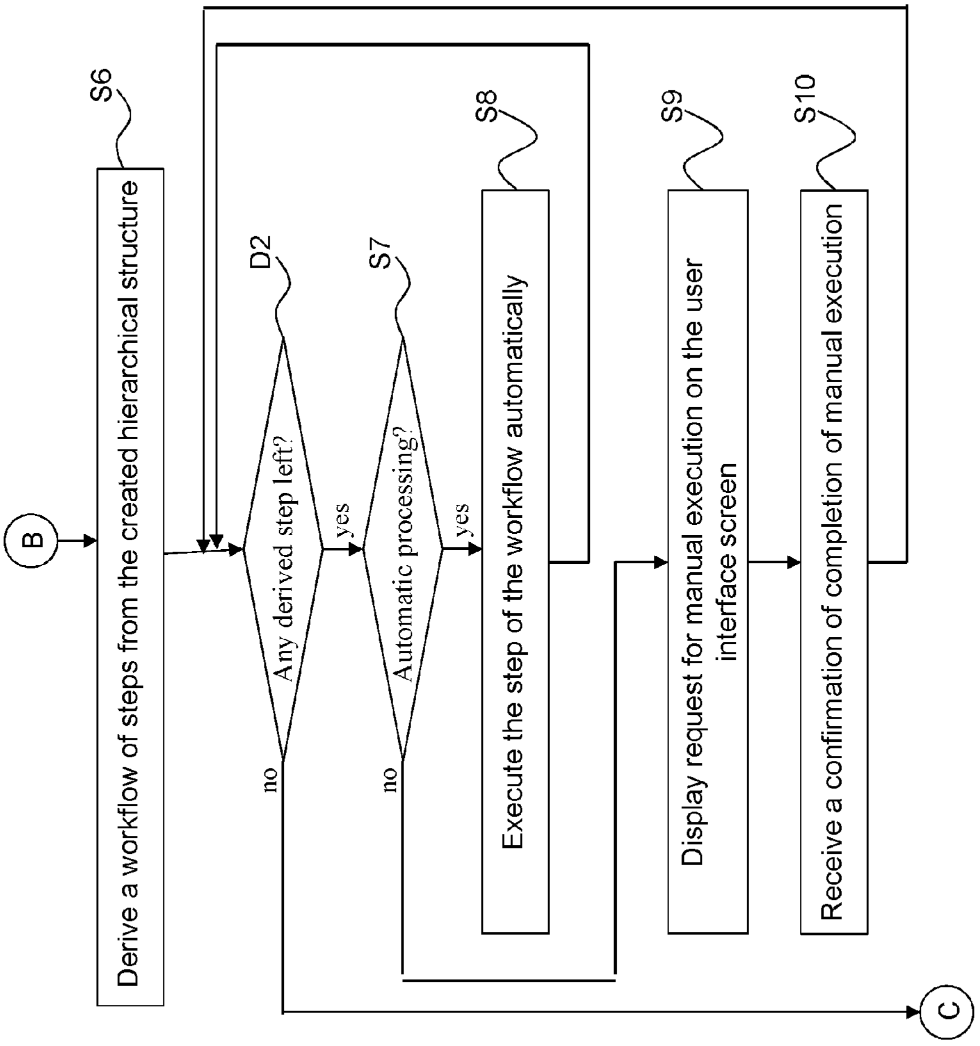

FIG. 6 shows a second embodiment of the method according to the invention. The method starts with the steps S1-S5 of FIG. 5 and proceeds to the end point B in FIG. 5, which is simultaneously starting point B in FIG. 6. The starting point B in FIG. 6 leads to a sixth step S6.

In the sixth step S6, a workflow of steps is derived from the created hierarchical structure of the digital representations.

A seventh step S7 is executed for each step of the workflow in a second loop over the plurality of derived steps. The second loop starts in a second decision step D2, which checks if there is a step of the workflow that has not been dealt with. If there is a step not dealt with according to the method, the method proceeds with the seventh step S2. If all steps of the workflow are dealt with, the method ends in an end point C.

According to the seventh step S7, it is checked if the step of the workflow is suitable for automatic processing. If so, the method proceeds with the eighth step S8. If not, the method proceeds with the ninth step S9.

In the eighth step S8, the step of the workflow is automatically executed on one of the at least two devices in order to deliver at least a part of the combined print product. The method returns to the second decision step D2.

In the ninth step S9, a request for manual execution of the workflow step is displayed on the user interface screen of the combined print product processing system according to the invention.

In a tenth step S10, a confirmation of completion of the manual execution of the step of the workflow is received by or entered into the control unit. The method returns to the second decision step D2.

The second embodiment of the method ends in an end point C.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for creating and processing specifications for a combined print product, the combined print product being a combination of at least two sub-products, where at least one sub-product is a print product, the method comprising the steps of:

determining, based on an output specification of the combined print product, a plurality of parts needed to produce the combined print product;

for each determined part, selecting a corresponding digital representation of the determined part from a digital representation collection;

displaying the digital representations of the determined parts on a user interface screen;

creating a digital hierarchical structure of the digital representations, wherein an order in the digital hierarchical structure defines usage of the parts, appliance of the parts and a combination of the parts in a production process of the combined print product; and displaying the digital hierarchical structure on the user interface screen, wherein each part of the plurality of parts belongs to a part category out of a set of part categories, the set of part categories comprising a device, a device action, a finishing action, an imposition action, a preflight action, a media assignment action, a human action, a digital or physical resource, a logical concept, an export action, a content manipulation, a sorting action, a check action, a combination action and a selection action, wherein the plurality of parts comprises at least two resources, at least one device action, at least one finishing action, at least one combination action, at least one device and at least two logical concepts and at least one imposition action, and wherein each of the at least two sub-products is a complete product produced according to the hierarchical structure for a separate use by an end user of the combined print product, and wherein the process further comprises the steps of:

deriving a workflow of steps from the production process of the combined print product; and executing the steps of the workflow on the plurality of parts in order to deliver the combined print product.

2. The method according to claim 1, further comprising the step of automatically receiving a specification of the combined print product.

3. The method according to claim 1, wherein the at least two resources are digital resources to be printed on a recording medium.

4. The method according to claim 1, wherein at least one of the two resources is a digital resource to be printed on a recording medium and at least one of the two resources is a physical resource at least to be finished according to a device action of the plurality of parts.

5. The method according to claim 1, further comprising the step of predicting a production time of the combined print product derived from the digital hierarchical structure.

6. The method according to claim 1, further comprising the step of predicting a cost of each of the at least two sub-products.

7. A non-transitory computer readable medium comprising computer executable program code configured to instruct a computer to perform the method according to claim 1.

8. The method according to claim 1, wherein at least one sub-product is a non-printed object or a 3D-printed object.

9. A combined print product processing system, comprising:

at least one device configured to execute of at least three device actions;

a memory storage configured to store digital resources;

a central and data gathering controller configured to:

receive an output specification of a combined print product, the combined print product being a combination of at least two-sub-products;

determine a plurality of parts needed to produce the combined print product based on an output specification of the combined print product; and select for each determined part, a corresponding digital representation of the determined part from a collection storage for storing a digital representation collection, and a user interface comprising a screen for displaying the digital representations of the determined parts and for displaying a digital hierarchical structure, wherein the central and data gathering controller is further configured to create the digital hierarchical structure of the digital representations in an order of at least one of usage of the parts, application of the parts and a combination of the parts in a production process of the combined print product, wherein each part of the plurality of parts belongs to a part category out of a set of part categories, the set of part categories comprising a device, a device action, a finishing action, an imposition action, a preflight action, a media assignment action, a human action, a digital or physical resource, a logical concept, an export action, a content manipulation, a sorting action, a check action, a combination action and a selection action, wherein the plurality of parts comprises at least two resources, at least one device action, at least one finishing action, at least one combination action, at least one device and at least two logical concepts and at least one imposition action, and wherein each of the at least two sub-products is a complete product produced according to the hierarchical structure for a separate use by an end user of the combined print product.

* * * * *